United States Patent
Lee

(10) Patent No.: US 8,307,682 B2
(45) Date of Patent: Nov. 13, 2012

(54) PIPE CHAMFERING DEVICE

(76) Inventor: Te Sheng Lee, Guantian Township (TW)

( * ) Notice: Subject to any disclaimer, the term of this patent is extended or adjusted under 35 U.S.C. 154(b) by 550 days.

(21) Appl. No.: 12/686,329

(22) Filed: Jan. 12, 2010

(65) Prior Publication Data

US 2011/0167887 A1     Jul. 14, 2011

(51) Int. Cl.
    *B21D 19/04*     (2006.01)
(52) U.S. Cl. ............................ 72/70; 72/120; 72/482.5
(58) Field of Classification Search ............... 72/70, 71, 72/120, 124, 482.5; 82/59, 61, 62, 73; 409/138, 409/140; 408/147, 153, 179; 407/36, 37, 407/44, 45
See application file for complete search history.

(56) References Cited

U.S. PATENT DOCUMENTS

| | | | | |
|---|---|---|---|---|
| 4,126,064 A | * | 11/1978 | Tarrant | 82/1.11 |
| 6,009,735 A | * | 1/2000 | Knotek | 72/70 |
| 6,109,151 A | * | 8/2000 | Braun et al. | 82/48 |
| 6,308,548 B1 | * | 10/2001 | Schwochert et al. | 72/126 |
| 6,918,278 B2 | * | 7/2005 | Dole et al. | 72/123 |
| 7,360,975 B2 | * | 4/2008 | Hall | 409/138 |
| 8,226,335 B2 | * | 7/2012 | Frick | 407/113 |

* cited by examiner

*Primary Examiner* — Edward Tolan

(57) ABSTRACT

A pipe chamfering device for chamfering an opening of a metal pipe has a secured member, a sliding member mounted on the secured member, and a chamfer cutting tool apron mounted on the sliding member. The secured member is secured onto a rotating plate, and a dovetail block is formed on a front side of the secured member. The sliding member has a dovetail slot on a rear side mounted correspondingly with and sliding along the dovetail block of the secured member. The sliding member has an axial aperture, and an axial rod is disposed in the axial aperture. A front end of the axial rod extends from a front side of the sliding member and is connected to a roller. The chamfer cutting tool apron has a chamfer cutting tool, and the chamfer cutting tool apron is mounted on the strip slot of the sliding member. The chamfer cutting tool is able to be driven by the rotating plate and is capable of forming a weld root with an even thickness at an opening of a non-circular pipe.

3 Claims, 10 Drawing Sheets

PIPE CHAMFERING DEVICE

BACKGROUND OF THE INVENTION

1. Field of the Invention

The present invention relates to a pipe chamfering device, and more particularly to a pipe chamfering device which is capable of forming a weld root with an even thickness at an opening of a non-circular pipe.

2. Description of the Related Art

In order to improve the strength of welded connections between metal pipes and to improve the penetrating ability of the welding materials, it is necessary to perform a chamfering process to the pipe metal to form a weld root on the opening edge of the metal pipe.

Typical pipe chamfering devices (such as disclosed in Taiwan design patent No. M317897) comprise a cutting tool on a rotating plate, with rotation provided by the rotating plate. The cutting tool is driven to chamfer the pipe opening of the metal pipe.

However, the above-mentioned pipe chamfering device has the cutting tool placed directly on the rotating plate and driven directly by the rotating plate. Therefore, when the pipe opening of the metal pipe is not circular, the weld root formed by the chamfering process may have an uneven thickness even if the pipe opening is pre-processed for a shape that is more circular, with the result that the penetrating ability of the welding materials and the strength of the welded connection are both affected.

Therefore, it is desirable to provide a pipe chamfering device to mitigate and/or obviate the aforementioned problems.

SUMMARY OF THE INVENTION

An objective of the present invention is to provide a pipe chamfering device which is capable of forming a weld root with an even thickness at an opening of a non-circular pipe.

In order to achieve the above-mentioned objective, the pipe chamfering device has a secured member, a sliding member, a chamfer cutting tool apron, a deburring cutting tool apron and a weld root reshaping apron. The secured member is secured onto a rotating plate and has a hollow section through front and rear side faces and through apertures at upper and lower ends of the secured member connected to the hollow section. Each through aperture accepts a spring, a threaded section formed at an outer end of each through aperture for engaging with a bolt, and a dovetail block formed on a front side of the secured member.

The sliding member has a dovetail slot on a rear side mounted correspondingly with and sliding along the dovetail block of the secured member. The sliding member has an axial aperture, and an axial rod is disposed in the axial aperture. A front end of the axial rod extends from a front side of the sliding member and is connected to a roller, and an inclined face is formed at a front edge of the roller. A rear end of the axial rod extends into the hollow section of the secured member and forms a rectangular block, and the rectangular block is respectively compressed by the springs in the secured member. Furthermore, a strip slot disposed on the sliding member.

The chamfer cutting tool apron has a chamfer cutting tool, the chamfer cutting tool apron is mounted on the strip slot of the sliding member, and the chamfer cutting tool apron is capable of adjusting a gap on the strip slot between the chamfer cutting tool and the roller.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
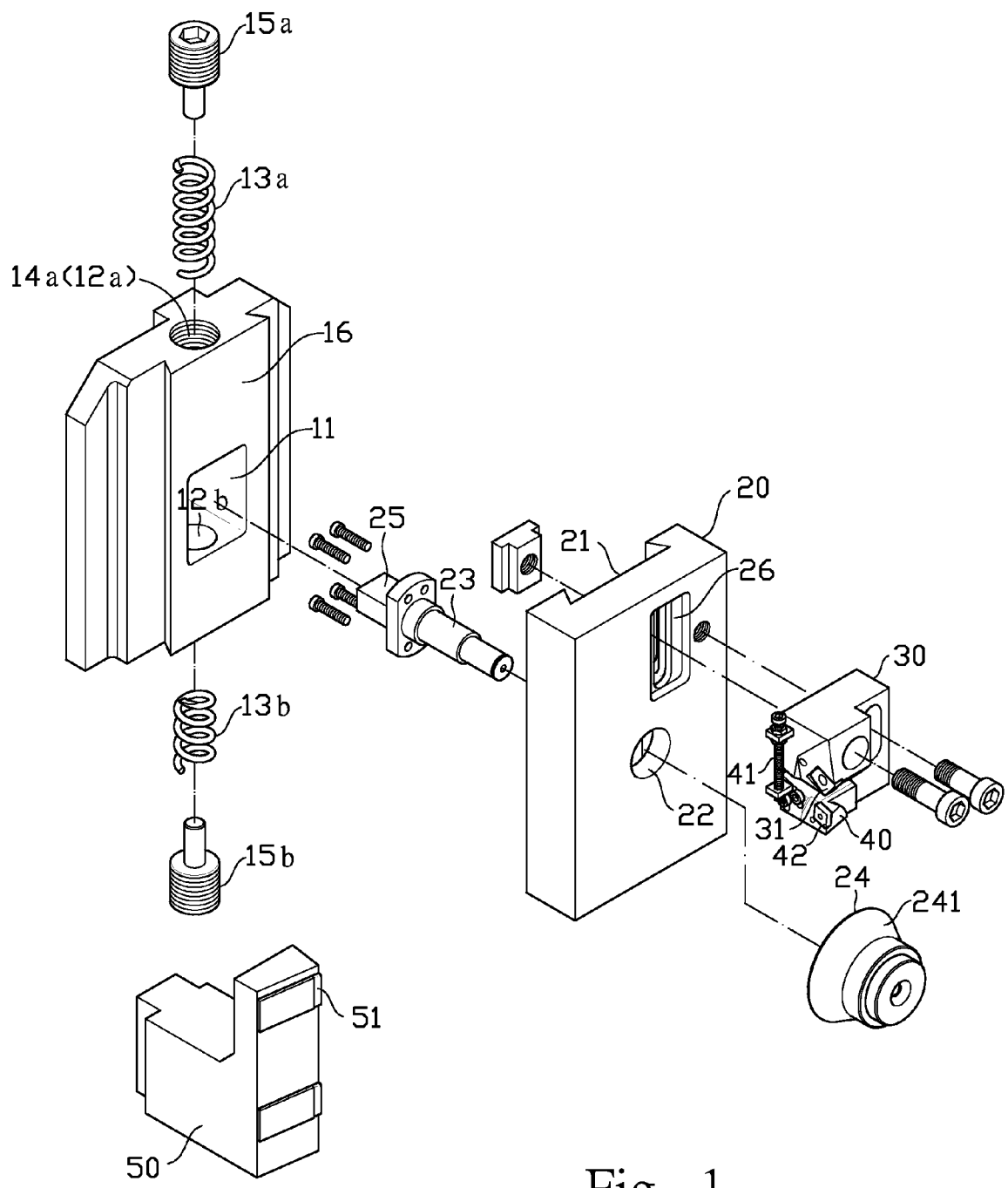
FIG. 1 is an exploded perspective view of an embodiment of the present invention.
Figure 2:
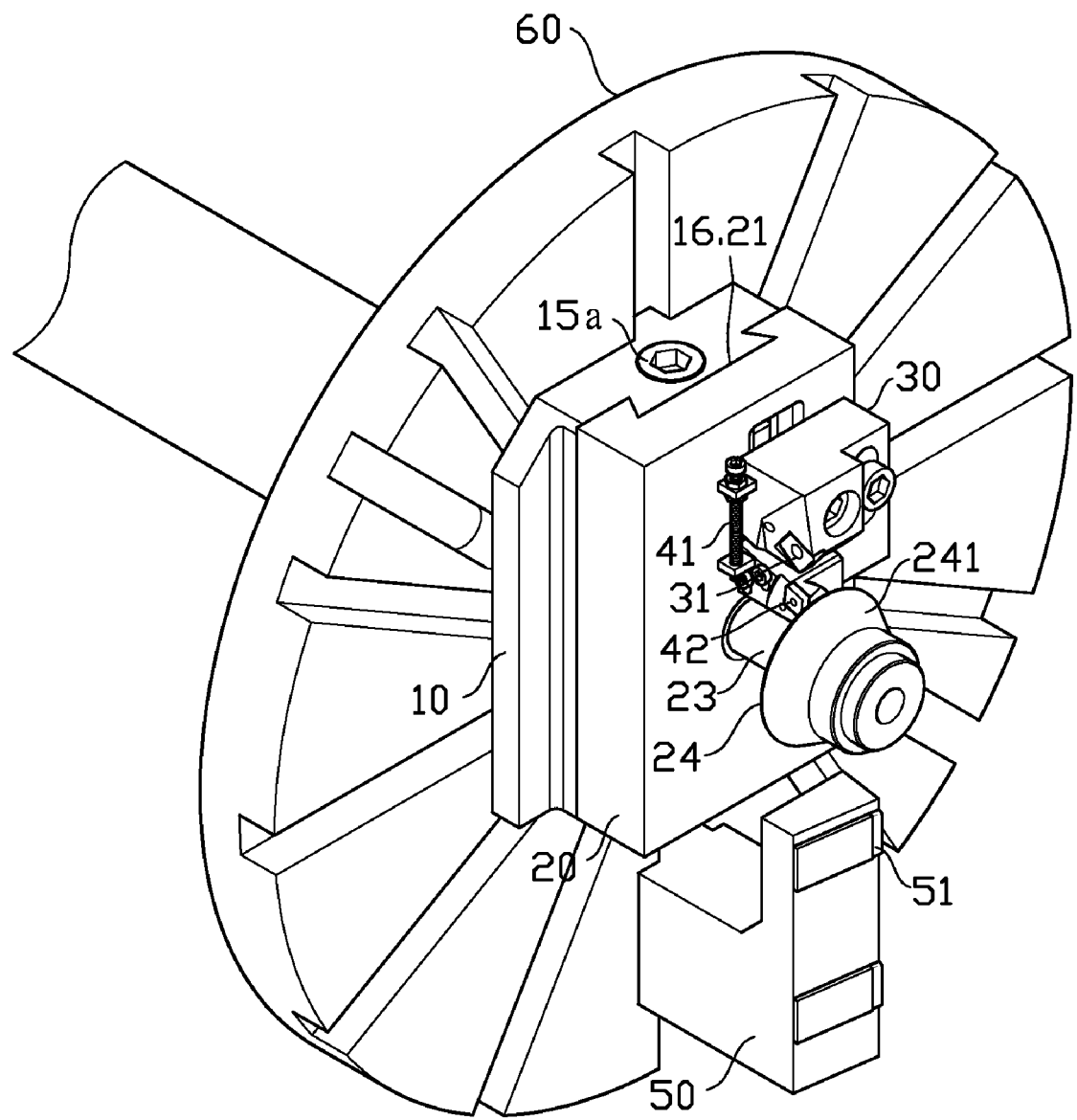
FIG. 2 is an assembled perspective drawing of an embodiment of the present invention.

Please refer to FIG. 1 and FIG. 2. In this embodiment, a pipe chamfering device comprises a secured member 10, a sliding member 20, a chamfer cutting tool apron 30, a deburring cutting tool apron 40 and a weld root reshaping apron 50.

Figure 3:
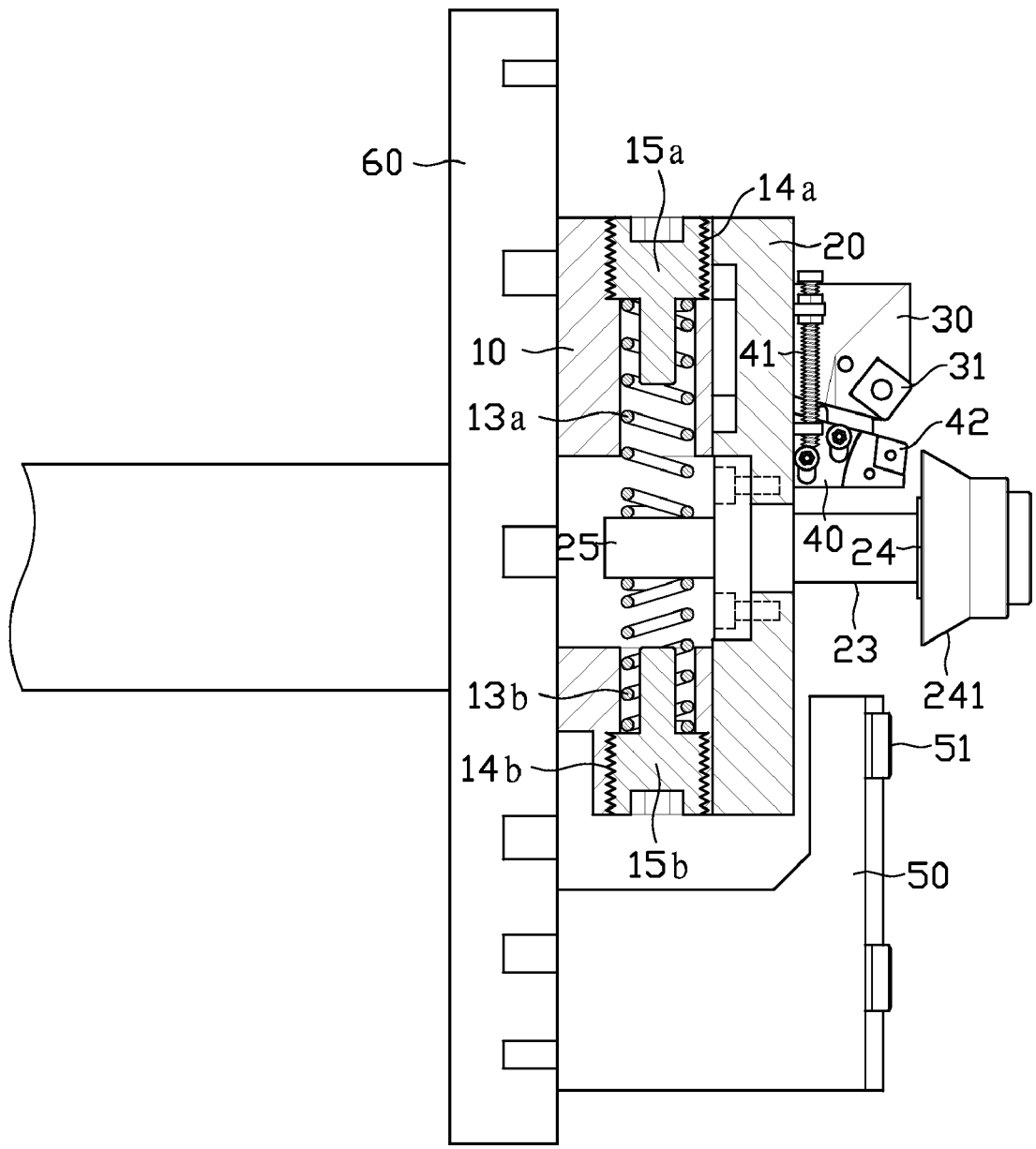
FIG. 3 is a cross-sectional view of an embodiment of the present invention.

The secured member 10, with reference to FIG. 3, is secured onto a rotating plate 60 and has a hollow section 11 through its front and rear side faces and through apertures 12A, 12B at upper and lower ends of the secured member 10 that connect to the hollow section 11. Each through aperture 12A, 12B accepts a spring 13A, 13B, and a threaded section 14A, 14B is formed along an outer end of each through aperture 12A, 12B for engaging with a bolt 15A, 15B. A dovetail block 16 is formed on a front side of the secured member 10.

The sliding member 20, with reference to FIG. 3, has a dovetail slot 21 on a rear side that mounts correspondingly with and slides along the dovetail block 16 of the secured member 10. The sliding member 20 further has an axial aperture 22. An axial rod 23 is disposed in the axial aperture 22, and a front end of the axial rod 23 extends from a front side of the sliding member 20 and connects to a roller 24. An inclined face 241 is formed on a front edge of the roller 24. A rear end of the axial rod 23 extends into the hollow section 11 of the secured member 10 and is shaped as a rectangular block 25. The rectangular block 25 is respectively compressed by the two springs 13A, 13B in the secured member 10, and a strip slot 26 is disposed on the sliding member 20.

The chamfer cutting tool 31 and the chamfer cutting tool apron 30 are mounted on the strip slot 26 of the sliding member 20; Using the strip slot 26, the chamfer cutting tool apron 30 is capable of adjusting a gap between the chamfer cutting tool 31 and the roller 24.

The deburring cutting tool apron 40, with reference to FIG. 3, is installed below the chamfer cutting tool apron 30 with a threaded member 41. The deburring cutting tool apron 40 has a deburring cutting tool 42, and the deburring cutting tool apron 40 utilizes the threaded member 41 to adjust a gap between the deburring cutting tool 42 and the chamfer cutting tool 31.

The weld root reshaping apron 50, with reference to FIG. 3, is installed on the rotating plate 60, and the weld root reshaping apron 50 has a weld root reshaping tool 51.

Figure 4:
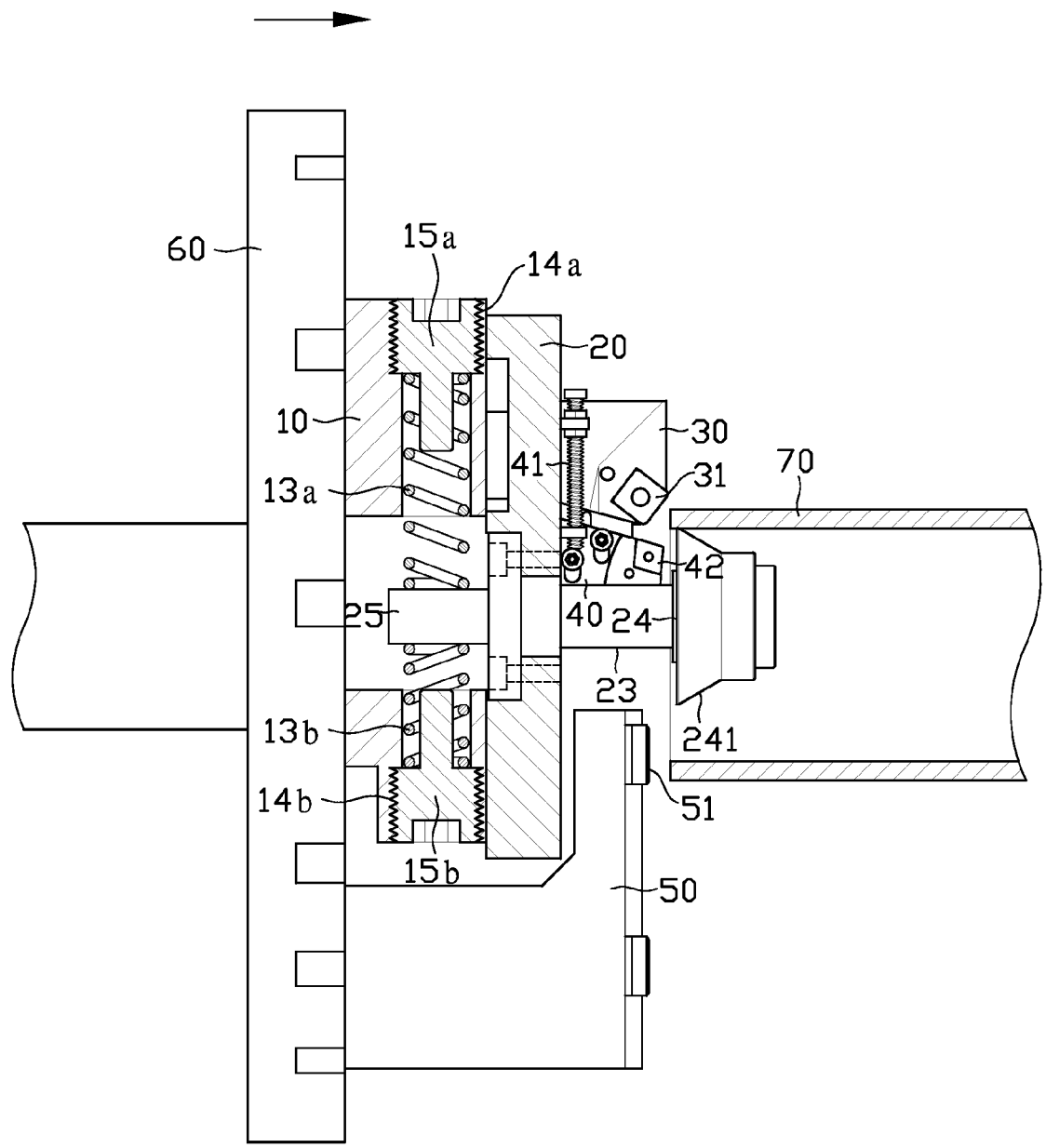
FIG. 4 is a cross-sectional view of a roller being pushed by a metal pipe, sliding into the pipe and pushing against an inner wall of the pipe opening.
Figure 5:
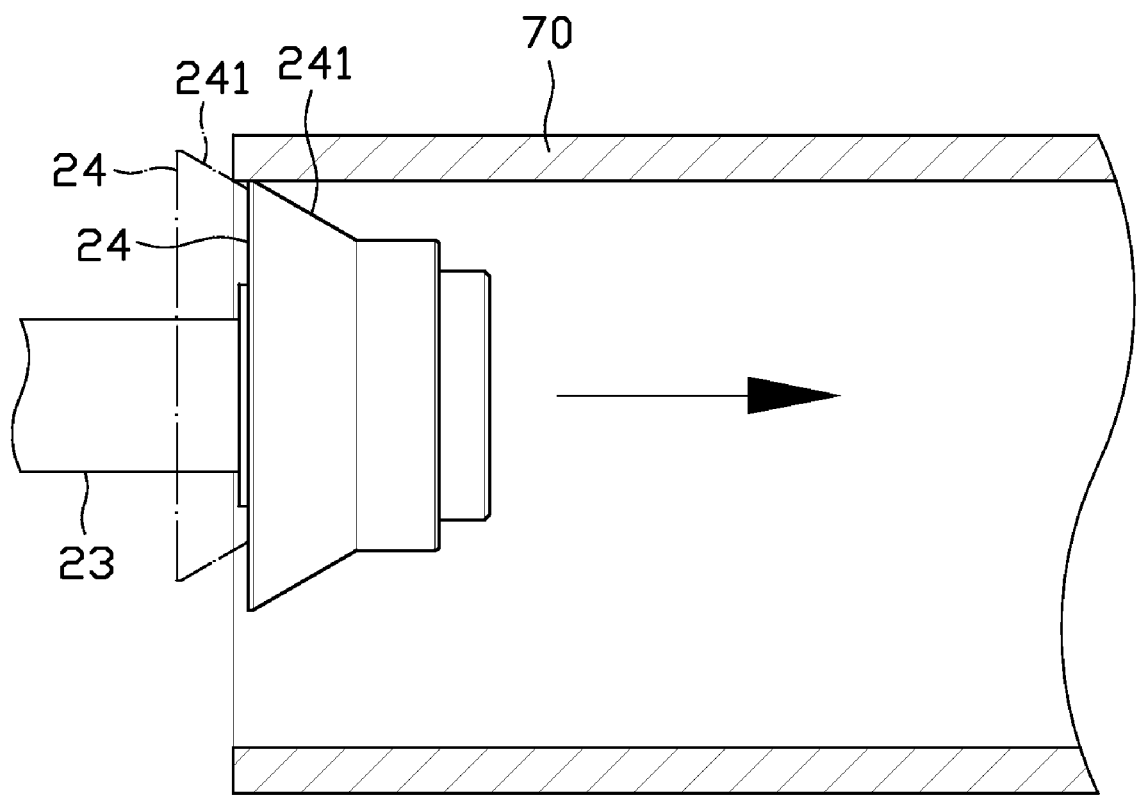
FIG. 5 is a detailed view of a region in the cross-sectional view of FIG. 4.
Figure 6:
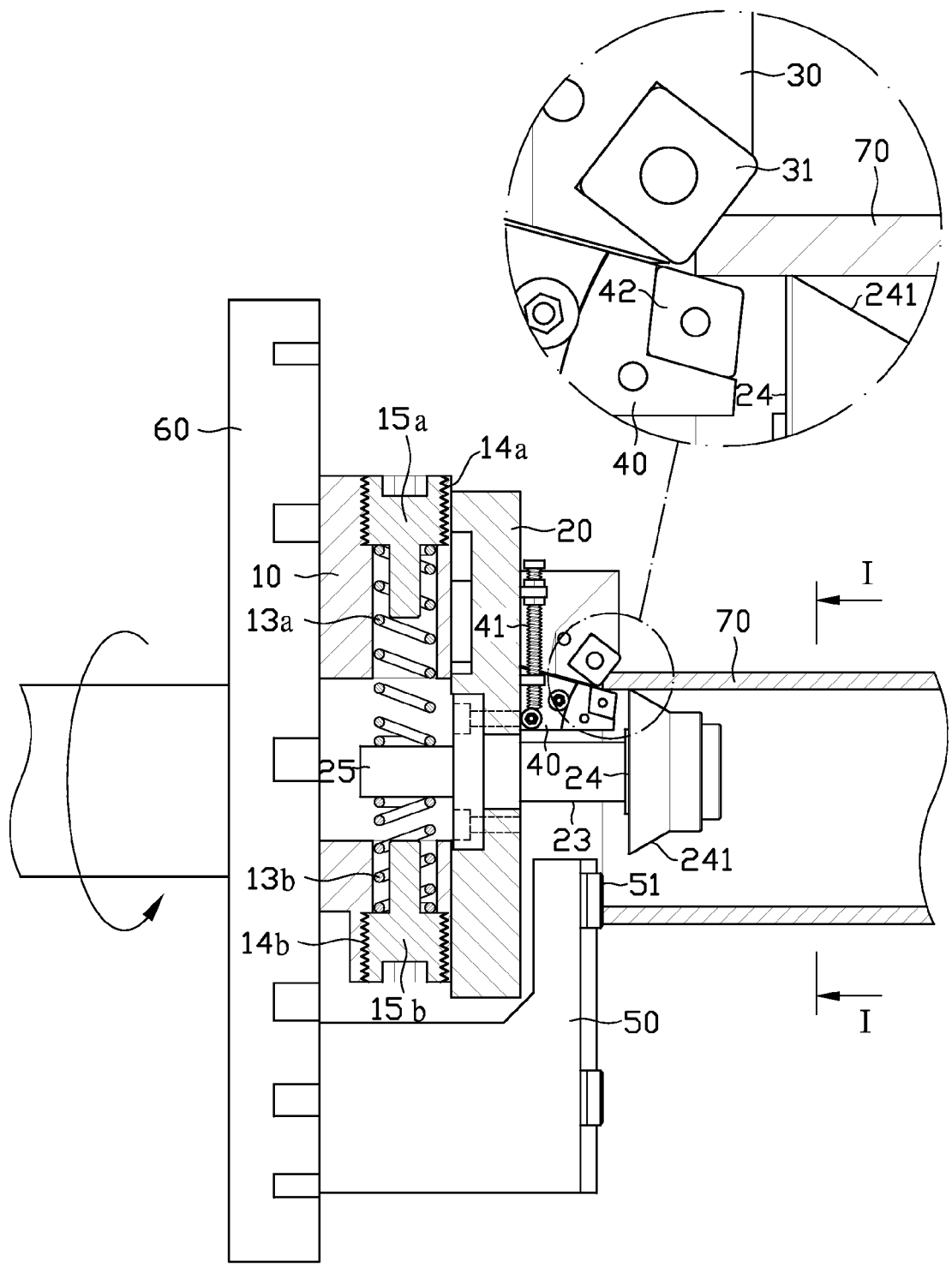
FIG. 6 is a cross-sectional view of a roller pushing against an inner wall of a pipe opening while a rotating plate is rotating; a chamfer cutting tool of a chamfer cutting tool apron chamfering the opening of the metal pipe; and a deburring cutting tool of a deburring cutting tool apron deburring the opening edge of the metal pipe.
Figure 7:
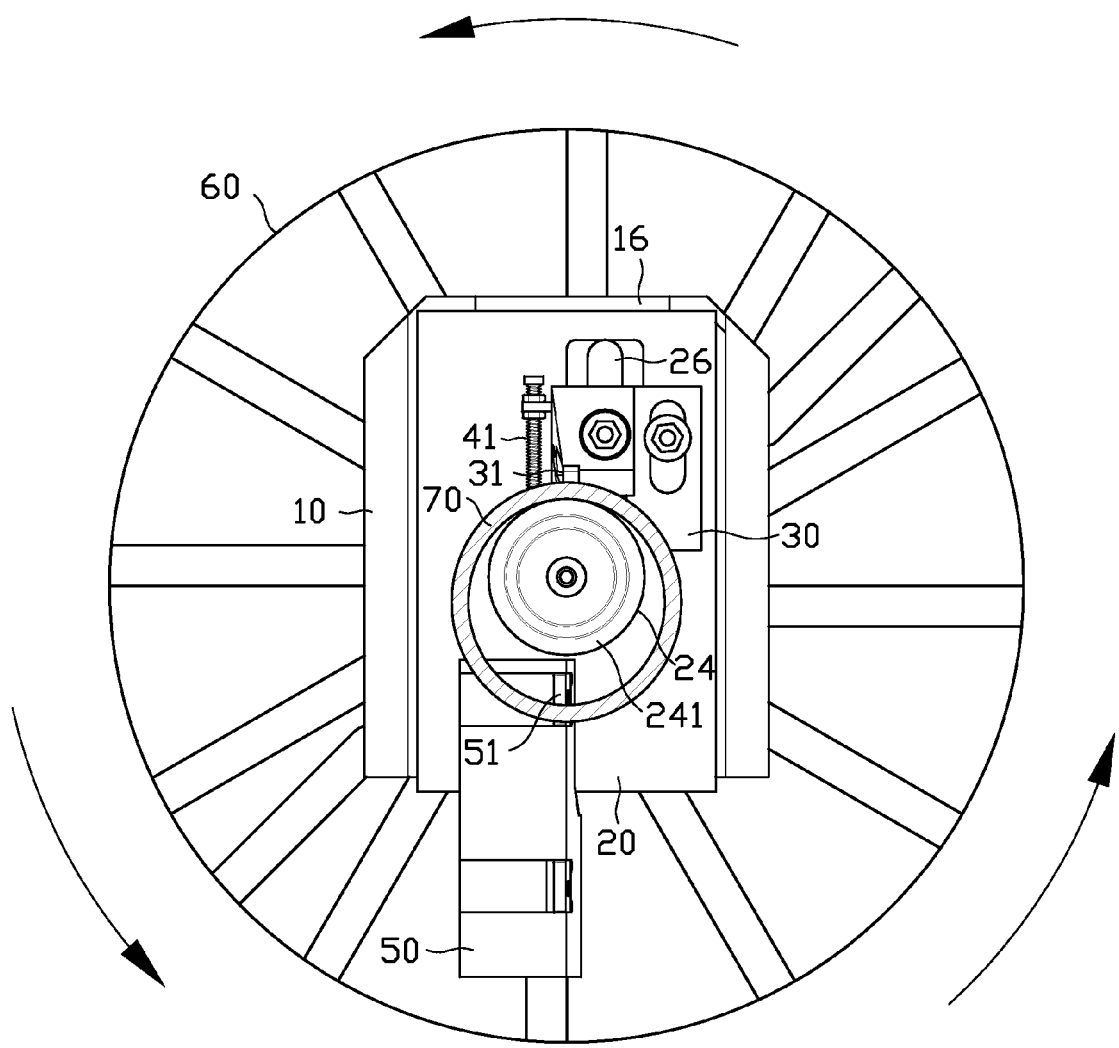
FIG. 7 is a cross-sectional drawing along a line I-I shown in FIG. 6.
Figure 8:
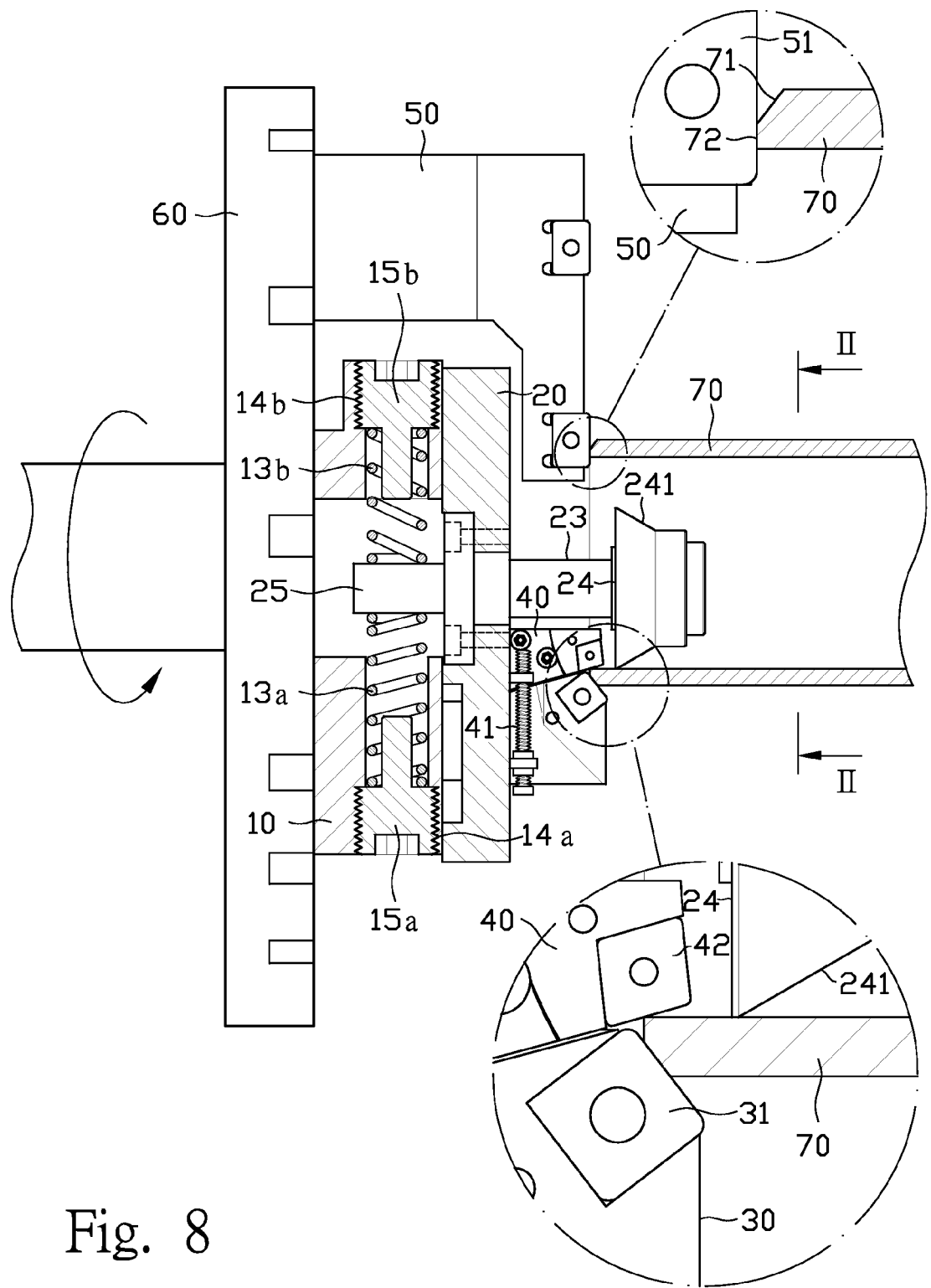
FIG. 8 is a cross-sectional view of a weld root reshaping tool of a weld root reshaping apron driven by a rotating plate reshaping a metal pipe.
Figure 9:
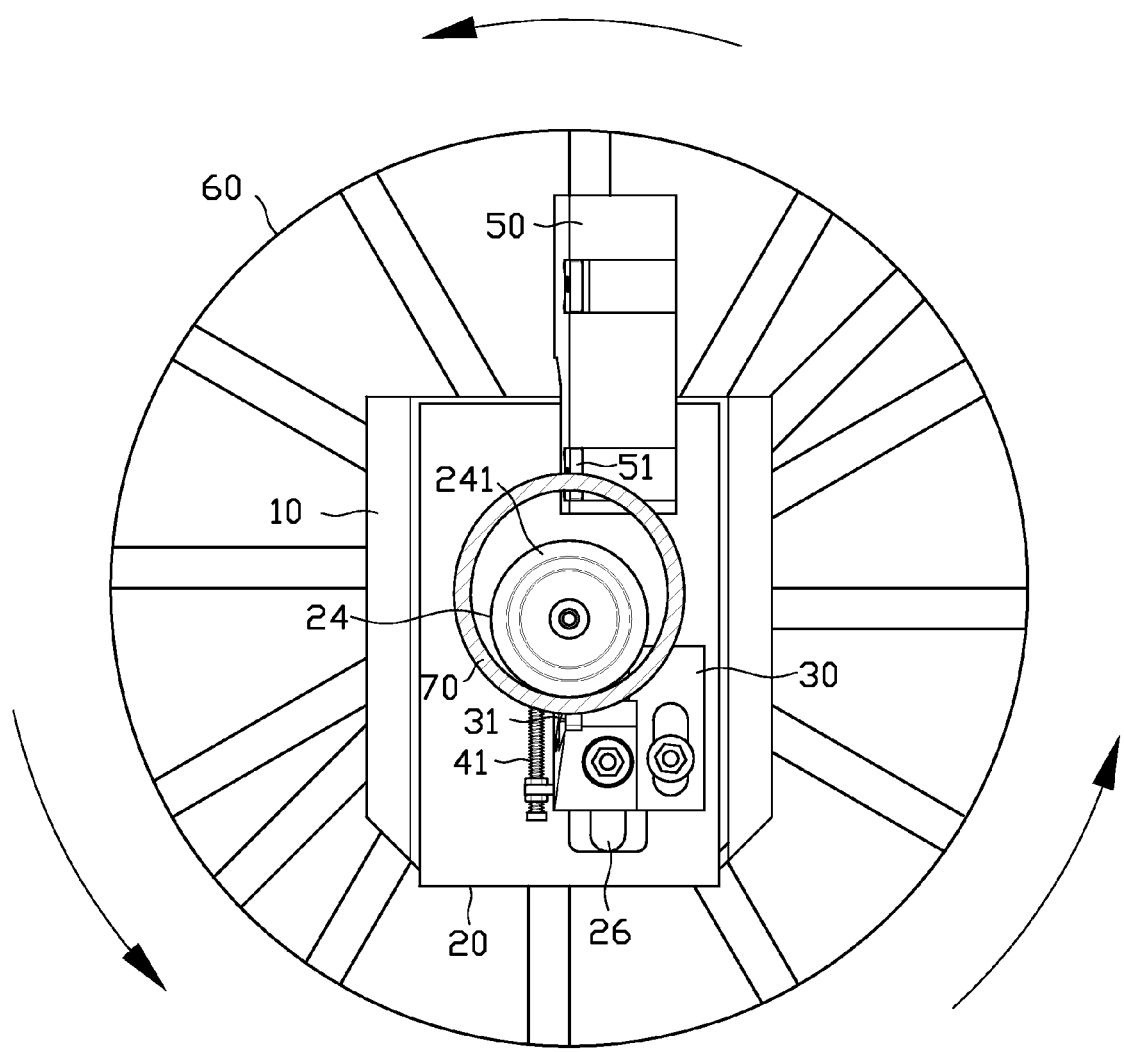
FIG. 9 is a cross-sectional drawing along a line II-II shown in FIG. 8.
Figure 10:
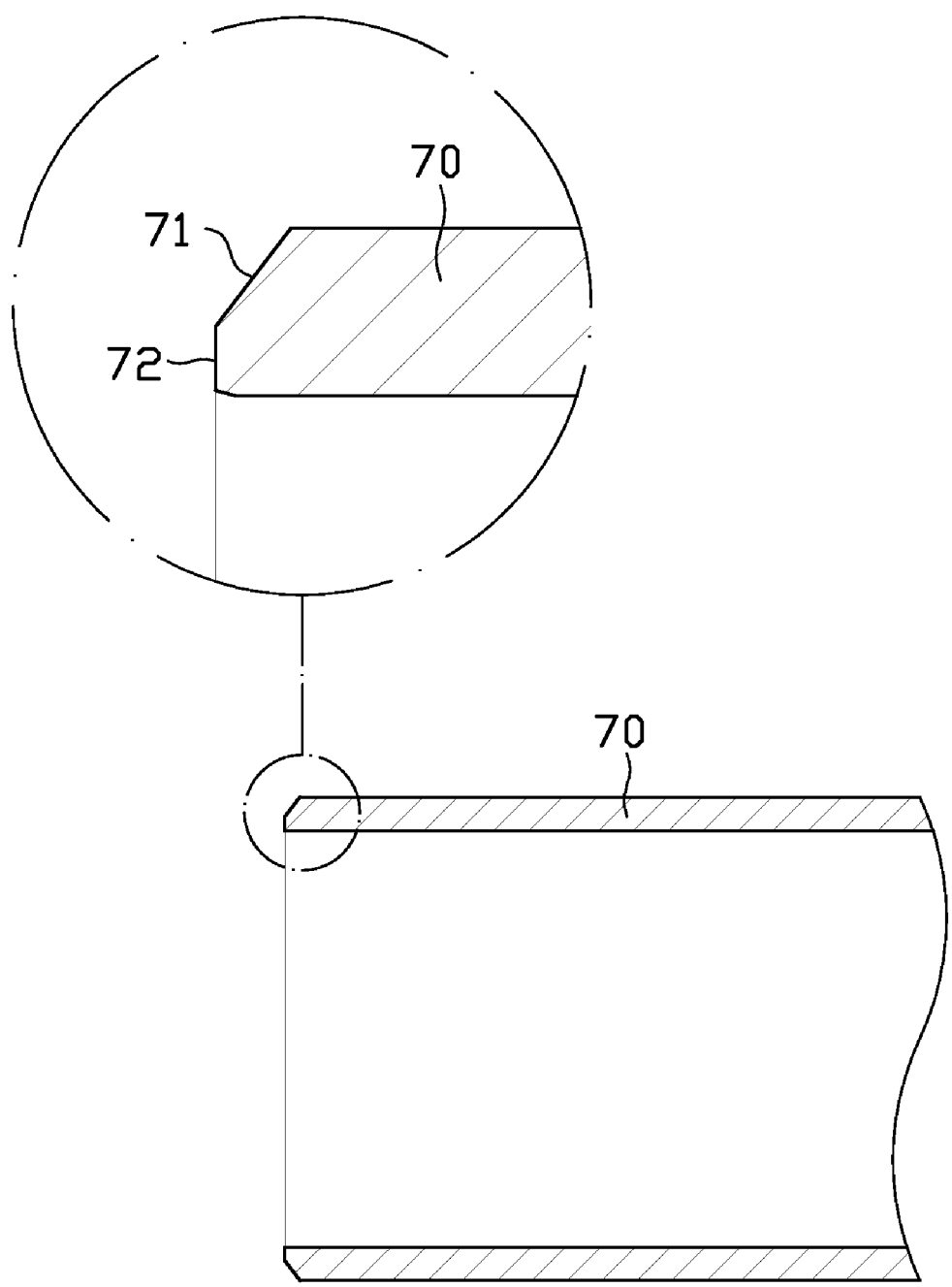
FIG. 10 is a schematic drawing of the chamfering of a pipe opening of a metal pipe to form a bevel and weld root.

With the above-mentioned structure, as shown in FIG. 4, when a chamfering process is performed to a metal pipe 70, the rotating plate 60 is pushed towards the metal pipe 70 to cause the inclined face 241 of the roller 24 to push against the pipe opening of the metal pipe 70. The roller 24 is pushed by the pipe opening of the metal pipe 70 and slides into the inside of the metal pipe 70 such that outer edge of the roller 24 pushes against the inner wall of the opening of the metal pipe 70 (as shown in FIG. 5). Next, as shown in FIGS. 6 to 9, the rotating plate 60 is continuously pushed such that the opening of the metal pipe 70 contacts the chamfer cutting tool 31 of the chamfer cutting tool apron 30. With the rotation provided by the rotating plate 60, the chamfer cutting tool 31 of the chamfer cutting tool apron 30 performs the chamfering process upon the pipe opening of the metal pipe 70 to form a bevel 71 and shapes the pipe opening of the metal pipe 70 to form a weld root 72 (as shown in FIG. 10). Meanwhile, with the rotation provided by the rotating plate 60, the deburring cutting tool 42 of the deburring cutting tool apron 40 is able to debur an inner edge of the opening of the metal pipe 70. Furthermore, with the rotation provided by the rotating plate 60, the weld root reshaping tool 51 of the weld root reshaping apron 50 is able to reshape the weld root 72 of the metal pipe 70.

Therefore, the pipe chamfering device of the present invention can perform the chamfering process to form the bevel 71, the deburring process and the reshaping process for the weld root 72 for the pipe opening of the metal pipe 70. The rear end of the axial rod 23 of the sliding member 20 is biased by the two springs 13A, 13B in the secured member 10, such that the edge of the roller 24 presses tightly against the inner wall of the opening of the metal pipe 70 and moves along the inner wall of the opening of the metal pipe 70 with the rotation provided by the rotating plate 60. Therefore, even if the opening of the metal pipe 70 is not circular in shape, the thickness of the weld root 72 obtained be the chamfer process is still even.

Although the present invention has been explained in relation to its preferred embodiment, it is to be understood that many other possible modifications and variations can be made without departing from the spirit and scope of the invention as hereinafter claimed.

What is claimed is:

1. A pipe chamfering device for chamfering an opening of a metal pipe comprising:
    a secured member secured onto a rotating plate and having a hollow section through front and rear side faces and through apertures at upper and lower ends of the secured member connected to the hollow section, each through aperture accepting a spring, a threaded section formed at an outer end of each through aperture for engaging with a bolt, and a dovetail block formed on a front side of the secured member;
    a sliding member having a dovetail slot on a rear side mounted correspondingly with and sliding along the dovetail block of the secured member, the sliding member having an axial aperture, an axial rod disposed in the axial aperture, a front end of the axial rod extending from a front side of the sliding member and connected to a roller, an inclined face formed at a front edge of the roller, a rear end of the axial rod extending into the hollow section of the secured member and forming a rectangular block, the rectangular block respectively compressed by the springs in the secured member, and a strip slot disposed on the sliding member; and
    a chamfer cutting tool apron having a chamfer cutting tool, the chamfer cutting tool apron mounted on the strip slot of the sliding member, the chamfer cutting tool apron capable of adjusting a gap on the strip slot between the chamfer cutting tool and the roller.

2. The pipe chamfering device as claimed in claim 1 further comprising a deburring cutting tool apron, the deburring cutting tool apron installed below the chamfer cutting tool apron with a threaded member, the deburring cutting tool apron having a deburring cutting tool, the deburring cutting tool apron utilizing the threaded member to adjust a gap between the deburring cutting tool and the chamfer cutting tool such that the deburring cutting tool of the deburring cutting tool apron is capable of deburring a pipe opening of a metal pipe.

3. The pipe chamfering device as claimed in claim 1 further comprising a weld root reshaping apron installed on the rotating plate, the weld root reshaping apron having a weld root reshaping tool such that the weld root reshaping tool of the weld root reshaping apron is capable of reshaping a weld root of the metal pipe.

* * * * *